(12) United States Patent
Bour et al.

(10) Patent No.: US 7,840,323 B2
(45) Date of Patent: Nov. 23, 2010

(54) COLLISION RECOGNITION DEVICE FOR A VEHICLE

(75) Inventors: Christian Bour, Domprix (FR); Andreas Petereit, Schweich (DE)

(73) Assignee: IEE International Electronics & Engineering S.A. (LU)

(*) Notice: Subject to any disclaimer, the term of this patent is extended or adjusted under 35 U.S.C. 154(b) by 865 days.

(21) Appl. No.: 11/719,018

(22) PCT Filed: Nov. 10, 2005

(86) PCT No.: PCT/EP2005/055872

§ 371 (c)(1),
(2), (4) Date: May 10, 2007

(87) PCT Pub. No.: WO2006/051089

PCT Pub. Date: May 18, 2006

(65) Prior Publication Data

US 2009/0057109 A1    Mar. 5, 2009

(30) Foreign Application Priority Data

Nov. 11, 2004  (EP)  .................................. 04105706

(51) Int. Cl.
G06F 7/00    (2006.01)
(52) U.S. Cl. ............................. 701/36; 701/31; 701/45; 180/274; 280/735
(58) Field of Classification Search .................. 701/29, 701/31, 36, 45; 180/271, 274; 280/735
See application file for complete search history.

(56) References Cited

U.S. PATENT DOCUMENTS 6,561,301 B1 * 5/2003 Hattori et al. ............... 180/274
7,036,621 B2 * 5/2006 Takafuji et al. ............. 180/274
2004/0064230 A1   4/2004 Takafuji et al.

FOREIGN PATENT DOCUMENTS

DE    103 09 715    4/2004

OTHER PUBLICATIONS

International Search Report; PCT/EP2005/055872; Feb. 14, 2006.

* cited by examiner

Primary Examiner—Richard M. Camby
(74) Attorney, Agent, or Firm—Cantor Colburn LLP

(57) ABSTRACT

A collision recognition device for a vehicle is proposed, comprising a pressure sensor with a first electrode and a second electrode, both having first and second ends, the second end of the first electrode being connected to a first terminal of a first resistor, the second end of the second electrode being connected to a first terminal of a second resistor During use, a first voltage V1 is applied to the first end of the first electrode, a second voltage V2 is applied to a second terminal of the first resistor so that a voltage difference between said first terminal of the first resistor and said second terminal of said first resistor forms a first status voltage indicative of circuit integrity. A first signal voltage V3 at the second end of the second electrode is indicative of whether said first and second electrodes are in contact. During a collision, the two electrodes are pressed together in the collision zone, which creates an electrical contact in this region. The signal voltage V3 thus changes, and a collision can be detected. A fourth voltage V4 is applied to the first end of the second electrode and a fifth voltage V5 is applied to a second terminal of the second resistor so that a voltage difference between the first terminal of the second resistor and said second terminal of the second resistor forms a second status voltage indicative of circuit integrity.

16 Claims, 3 Drawing Sheets

COLLISION RECOGNITION DEVICE FOR A VEHICLE

TECHNICAL FIELD OF THE INVENTION

The present invention generally relates to an impact sensing device and more specifically to pressure sensors for detecting the occurrence of a collision and for determining the location and the width of an impact region on a vehicle.

BRIEF DISCUSSION OF RELATED ART

Collision recognition sensors are developed for safety systems of automotive vehicles. In case of a car/pedestrian collision, these safety systems shall help to protect the pedestrian by minimizing the impact violence of the pedestrian on the vehicle structure. Efficient control of such safety systems requires reliable sensing devices, which can timely sense the occurrence of a car/pedestrian collision. A collision detector may thus execute different detection steps. First, a collision event has to be identified and second, it must be determined whether a pedestrian has been struck. There are several approaches for assessing a collision situation. By using pressure sensors arranged at suitable locations on the outer periphery of the vehicle, one may e.g. determine the location and the size of the collision zone on the vehicle, which allows deciding whether measures to protect a pedestrian shall be initiated.

These collision sensors have to ensure reliable operation during the vehicle service lifetime. They have to be robust with regard operating conditions in a vehicle, e.g. they should be insensitive with regard to electromagnetic interference. Furthermore, collision sensing device should include system check routines, by which the sensor integrity and circuit integrity may be verified. Upon detection of a defect, the vehicle driver may be informed that the sensor needs to be replaced or repaired.

BRIEF SUMMARY OF THE INVENTION

The invention provides a collision sensor for a vehicle with improved safety features.

The present invention proposes, in a first embodiment, a collision recognition device for a vehicle, comprising a pressure sensor with a first electrode and a second electrode, both having first and second ends, the second end of the first electrode being connected to a first terminal of a first resistor, the second end of the second electrode being connected to a first terminal of a second resistor. During use, a first voltage V1 is applied to the first end of the first electrode and a second voltage V2 is applied to a second terminal of the first resistor so that a voltage difference between the first terminal of the first resistor and said second terminal of the first resistor forms a first status voltage indicative of circuit integrity.

A first signal voltage V3 at the second end of the second electrode indicates whether said first and second electrodes are in contact. During a collision, the two electrodes are pressed together in the collision zone, which creates an electrical contact between the two electrodes in this region. The signal voltage V3 thus changes, and a collision can be detected. The invention thus allows sensitive and reliable collision recognition with a simple and robust electrical circuit.

A fourth voltage V4 is furthermore applied to the first end of the second electrode and a fifth voltage V5 is applied to a second terminal of the second resistor so that a voltage difference between the first terminal of the second resistor and said second terminal of the second resistor forms a second status voltage indicative of circuit integrity.

Due to the first and second resistors being connected in series with the respective electrodes, a circuit failure anywhere in the respective electrode circuits results in a disappearance of the voltage difference across the respective resistor. The two status voltages thus provide information about the integrity of the circuits of the respective electrodes. This allows informing the vehicle driver if the collision recognition sensor shows any defect or malfunctioning. At the same time, the first signal voltage V3 indicates whether a collision provoking the contact of the two electrodes occurred. The ability to detect these two important parameters simultaneously constitutes an important advantage of the present invention. It is not necessary to switch the collision detector back and forth between a self-diagnostic mode requiring interruption of the collision detection circuit and a collision detection mode. Thus, during normal operation, the collision sensor is always online, which assures a high safety level.

In a vehicle, one preferably chooses V1 to be the operating voltage of the vehicle electronics, usually 5 V or 3.3 V, whereas V2 and V5 are both on ground. By suitable dimensioning of the resistors and the voltage V4, one assures that the self-diagnostic mode and collision detection mode do not interfere. If for instance R2 is chosen having a high resistance value, the influence of the self-diagnostic mode on the first signal voltage V3 is minimal, so that a contact of the two electrodes during a collision results in a substantial change of the first signal voltage V3. At the same time, a high resistance value for R2 also results in a substantial change of the second status voltage in case of collision sensor defect or malfunctioning, which allows any of these events to be detected reliably and unambiguously.

A suitable choice of supply voltages and resistances further assures the collision sensor to be highly immune against electromagnetic interferences due to an elevated signal-to-noise ratio.

In a preferred embodiment of the invention, the first electrode comprises an elongated patch of resistive material while the second electrode is arranged in substantially parallel relationship to this elongated patch. The elongated sensor thus forms some sort of voltage divider or linear potentiometer, wherein the voltage read on the second electrode depends on the location, at which the first and second electrode are brought into contact. Thus the first signal voltage may also indicate the location of an impact. If the patch shows e.g. a homogenous resistivity over its length, a linear relationship between collision location and detected signal voltage V3 is provided.

It will be appreciated that the fourth voltage V4 may be obtained by a connection of the first end of the second electrode to a first terminal of a third resistor, when a sixth voltage V6 is applied to a second terminal of said third resistor. By use of an appropriate resistor, the voltage applied to the second electrode can be adapted to a specific level. This is particularly useful if a single voltage supply is provided for both electrodes, which will usually be the case in a vehicle.

Advantageously, the collision recognition device further comprises a first switch connected to the second end of the first electrode so that, a seventh voltage V7 is applicable to the second end of the first electrode by closing said first switch. It is thus possible to change the potential difference across the first electrode. In operation in a vehicle, V7 may be ground, which ensues that the entire first voltage V1 drops across the first electrode, thereby increasing the sensitivity for determining the location of the collision by means of the first signal voltage V3.

In case of a collision, the elongated resistive patch of the first electrode is partly shorted by the second electrode. It is thus possible to determine the width of the collision by reading a second signal voltage V3' at the second end of the first electrode. For this measurement it is necessary that the first switch is open. The device may further comprise a branch with a second switch and a fourth resistor, said branch being connected with its first terminal to the second end of the first electrode so that an eighth voltage V8 is applicable to a second terminal of said branch. With the second switch closed, it is possible to adjust the sensitivity of the collision sensor with regard to collision width detection. As in a vehicle, V8 and V2 may be ground, fourth and first resistor are switched in parallel, if the second switch is closed. Thus it is possible to adjust the voltage drop across the resistive patch of the first electrode in order to allow a precise measurement of the collision width.

In another embodiment, the second electrode also comprises an elongated patch of resistive material. This allows to optimise the sensitivity of the device e.g. for different temperature ranges by using different configurations of the resistive patches.

Both first and second electrode may comprise a circuit branch with a switch for controlled shorting of respectively the first or second electrode, thereby allowing different measurement modes. Either the first or the second electrode may be operated as resistive electrode, while the other electrode is shorted.

A third switch can be connected to the first end of the second electrode so that a ninth voltage V9 is applicable to the first end of the second electrode by closing the third switch. Thereby it is possible to apply e.g. the first voltage V1 to both the first end of the first electrode and the first end of the second electrode.

In a preferred embodiment, each first and/or second switch is controlled by an electronic control unit responsive to said first signal voltage V3. The first signal voltage V3 may e.g. be provided to a Schmitt trigger, which is connected to the electronic control unit. Triggering of the Schmitt trigger may start an interrupt service routine of the electronic control unit, which then activates the first and/or second switch accordingly. This allows fast switching between different detection modes and upon collision, a predetermined sequence of detection modes can be started by means of one or more Schmitt triggers. Only a few switches are necessary for a collision assessment including location and width measurement, which results in low material costs and fast measurement.

It will be appreciated, that the second voltage V2 applied to the second terminal of the first resistor causes a current to flow through the first resistor, said current being fed through the first electrode of the pressure sensor. The skilled person will thus easily appreciate, that the voltage source generating the second voltage V2 together with the first resistor form a current generating means for feeding a current through the first electrode.

It follows that in a second embodiment, the invention further encompasses a collision recognition device for a vehicle, comprising a pressure sensor with a first, electrode and a second electrode, both having first and second ends, the second end of the first electrode being connected to a first terminal of a first current generation means, the first current generation means being able to generate a first current through the first electrode, the second end of the second electrode being connected to a first terminal of a second resistor and the first end of the second electrode being connected to a first terminal of a third resistor.

During use, the current generation means generates a first current through the first resistive electrode, so that a voltage at the second end of the first electrode is indicative of circuit integrity and that a first signal voltage V3 at the second end of the second electrode is indicative of whether the first and second electrodes are in contact. In addition, a fifth voltage V5 is applied to a second terminal of the second resistor and a sixth voltage V6 is applied to a second end of the third resistor so that a voltage difference between the first terminal of the second resistor and the second terminal of the second resistor forms a second status voltage indicative of circuit integrity.

Preferably, the current generation means comprises or consists of a current source. As the skilled artisan will notice, the current generation means can encompass different types of resistive elements, such as a current source, a resistor or the like.

In conclusion, it may be noted, that the present invention very generally relates to a collision recognition device, comprising a pressure sensor with a first electrode and a second electrode, both having first and second ends, a first current generation means, said first current generation means being able to generate a first current through said first electrode, a first output terminal connected between said first electrode and said first current generation means, a voltage source for applying a voltage V4 to a first end of said second electrode, and a second output terminal at said second end of said second electrode, wherein, during use, said current generation means generates a first current through said first electrode, so that a voltage V3' at the first output terminal is indicative of circuit integrity and that a first signal voltage V3 at said second output terminal is indicative of whether said first and second electrodes are in contact.

In a preferred embodiment of this collision detection device said second end of the second electrode is connected to a first terminal of a second resistor, and wherein in use, a fifth voltage V5 is applied to a second terminal of a second resistor so that a voltage difference between said first terminal of said second resistor and said second terminal of said second resistor forms a second status voltage at the second output terminal indicative of circuit integrity. Furthermore said fourth voltage V4 is preferably obtained by a connection of said first end of the second electrode to a first terminal of a third resistor, a sixth voltage V6 being applied to a second terminal of said third resistor.

BRIEF DESCRIPTION OF THE FIGURES

The present invention will be more apparent from the following description of several not limiting embodiments with reference to the attached drawings, wherein.

DETAILED DESCRIPTION OF THE INVENTION

Figure 1:
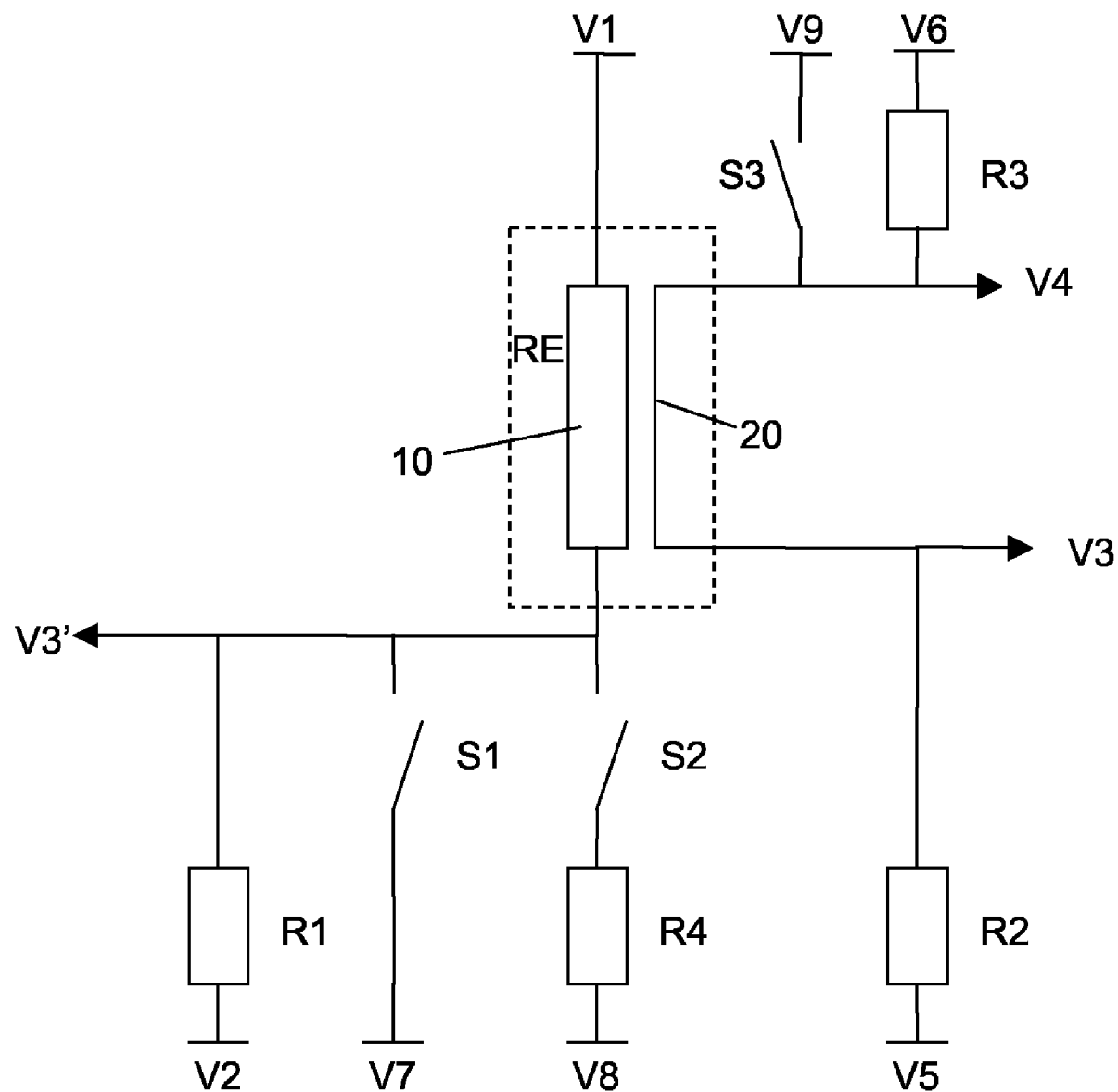
FIG. 1: shows a schematic of an electrical circuit of a collision recognition device.

The collision recognition device shown in FIG. 1 comprises a foil-type pressure sensor comprising a first elongated resistive electrode 10 with a total resistance RE and a second metal electrode 20, which is arranged in substantially parallel relationship to the first electrode. The elongated sensor thus forms a sort of voltage divider or linear potentiometer, wherein the voltage read on the second electrode depends on the location, at which the first and second electrode are brought into contact. The first electrode 10 is connected with its first end to a voltage supply at a potential V1 while its second end is connected to a first resistor R1, the potential at the opposite side of the resistor R1 being V2.

The second electrode 20 is connected with its second end to a second resistor with a high resistance R2, a voltage V5 being applied at the opposite terminal of the second resistor R2. At the first end of the second electrode 20, a third resistor with a high resistance R3 is connected. The third resistor R3 is connected with its other terminal to a voltage supply at a potential V6. In some cases, V6 may be chosen equal to V1, and V5 equal to V2. The potentials at the electrodes may be adapted by means of appropriate resistors. In the shown embodiment, the circuit is configured and dimensioned such that $R3 \gg R2 \gg RE$ and $V1 \gg V5$. Those skilled in the art will however be aware that the collision recognition device may be operated with reversed polarity; in this case the latter relation will of course become $V1 \ll V5$.

A first switch S1 allows applying a determined voltage V7 to the second end of the first electrode 10. The device further comprises a circuit branch with a second switch S2 and a fourth resistor R4, to which a voltage V8 is applied. A third switch S3 allows applying a voltage V9 to the first end of the second electrode 20.

The resistors may be printed onto the sensor foil, which is an easy way of manufacturing such a sensor. By printing the third resistor R3 onto the sheet of the sensor and connecting its second end on the sheet to the first end of the first electrode, one may furthermore reduce external wiring.

As long as no collision is detected, the device operates in a mode, which allows simultaneous detection of a collision and of circuit integrity. In this mode, the first switch S1 and the second switch S2 are open. The first signal voltage V3 at the second end of the second electrode 20 indicates whether the two electrodes are in contact, i.e. whether a collision occurred. At the same time, the difference between the second signal voltage V3' and V2 indicates whether the circuit of the first electrode 10 is intact. The difference between the first signal voltage V3 and V5 provides information about circuit integrity on the side of the second electrode 20. If V2 and V5 are on ground, as it may be the case in an operational environment in a vehicle, a line interruption in the circuit of the first electrode 10 is indicated by a vanishing difference V3'-V2. A line interruption in the circuit of the second electrode 20 is analogously indicated by a vanishing difference V3-V5.

In case of a collision, the second electrode is pressed against the first electrode such that the first signal voltage V3 substantially changes. This change may easily be detected by a Schmitt trigger with an appropriate threshold.

The device can then be switched to collision location mode by closing the first switch S1, e.g. by an electronic control unit connected to the above-mentioned Schmitt trigger. By closing the first switch S1, the sensitivity of the device for collision location detection may be increased. With V7 on ground, the whole voltage V1 drops across the first resistive electrode 10. The region where the two electrodes are in contact corresponds to a certain potential between ground and V1, which is indicated by the first signal voltage V3. If the different resistances R2 and R3 are suitably configured so as to be much higher than RE, these resistances have no impact in the resulting signal voltage V3 and thus do not interfere with the impact location detection.

It should be noted that circuit integrity with respect to the second electrode may also be checked by closing S3 and by monitoring the first signal voltage V3. In this case, with V1 equal to V9, it is also possible to concurrently determine the collision location by means of the second signal voltage V3' with the first switch S1 in open and the third switch S3 in closed position. The measurement is analogous to the collision location determination with the first signal voltage V3 as discussed above.

In a third step, the width of the collision region is detected. This is possible because the second electrode 20 partly short-circuits the resistive first electrode 10 upon collision. Accordingly, the second signal voltage V3' indicates the width of the collapsed region. In order to allow a more precise detection, the first switch S1 is opened and the second switch S2 is closed. In an operational environment in a vehicle, V2 and V8 can be ground. Hence, closing S2 switches the fourth and the first resistor in parallel, whereby the resulting corresponding resistance may be optimized for easy evaluation of the impact width.

It should be noted, the steps of measuring the collision width and collision location may be executed in different order.

Figure 2:
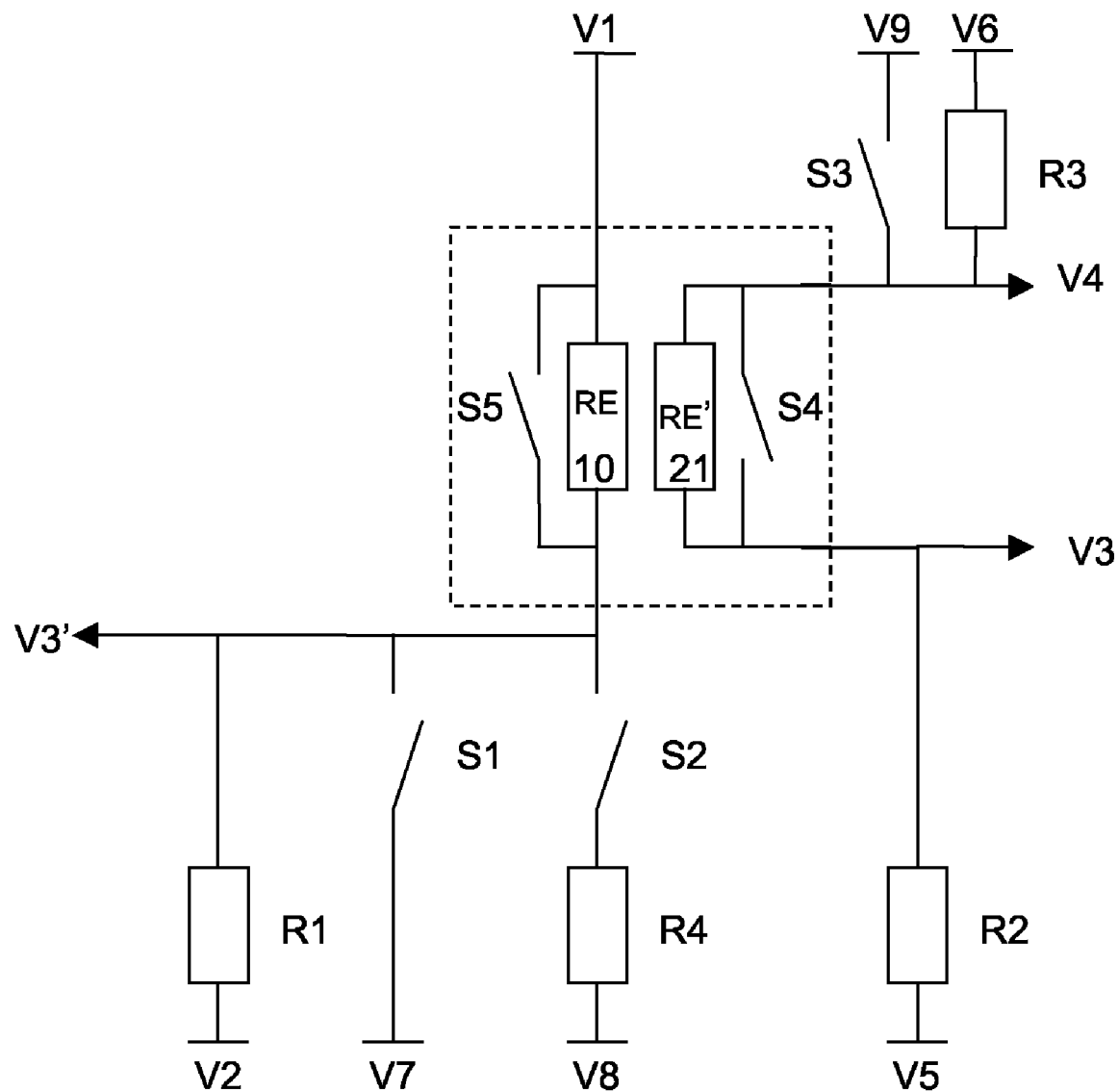
FIG. 2: shows a schematic of an electrical circuit of a double switch collision recognition device.

FIG. 2 shows a different embodiment of the collision detection device. In this embodiment, the first electrode 10 and the second electrode 21 each comprise an elongated patch of resistive material, with resistance RE or RE', respectively. The electrodes are arranged in substantially parallel relationship. The voltage read on the second end of the second electrode or on the second end of the first electrode depends on the location, at which the first and second electrodes are brought into contact. The sensitivity of the device may be optimised for different temperature ranges by adequate design of the resistive electrodes. First and second electrodes comprise a circuit branch with a switch for controlled shorting of respectively the first or second electrode, thereby allowing different measurement modes. Either the first or the second electrode may be operated as resistive electrode, while both ends of the other electrode are held at the same voltage.

Figure 3:
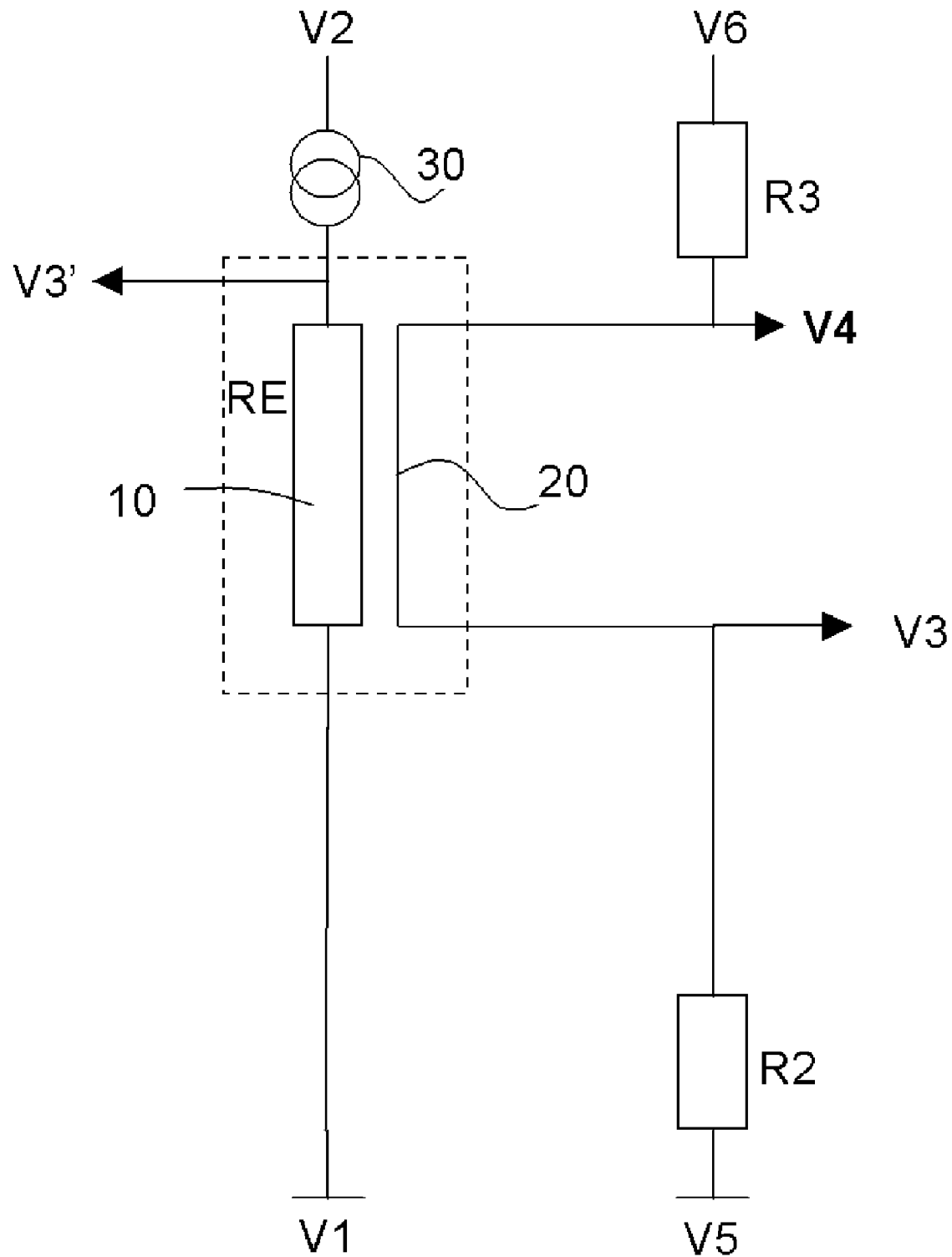
FIG. 3: shows a schematic of an alternative electrical circuit of a collision recognition device.

In the electrical circuit for a collision recognition device shown in FIG. 3 a current source 30 supplies a substantially constant current to the second end of the first electrode 10. The first end of the first electrode 10 is connected to V1, which may be ground. The second end of the second electrode 20 is connected to the first terminal of the second resistor R2, while the first end of the second electrode 20 is connected to the first terminal of the third resistor R3. The second terminal of R2 and R3 are connected to voltages V5 and V6, respectively.

If there is no collision, the first signal voltage V3 of the second electrode 20 indicates whether the circuit of the second electrode 20 is intact. If the latter is interrupted, V3 takes either the value of V5 or V6. Similarly, the voltage V3' at the second end of the first electrode 10 indicates whether the electric circuit of the first electrode 10 is intact. For determining this, one may consider either the difference between V3' and V2 or the difference between V3' and V1 as the difference between V1 and the supply voltage V2 of the current source 30 is substantially constant. In case of a collision, the second electrode 20 is pressed against the first electrode 10 so that the first signal voltage V3 substantially changes. This change may easily be detected by a Schmitt trigger, which compares e.g. V3 and V3'.

Assuming numerical values of about 100 k$\Omega$ for R3, 1 M$\Omega$ for R2, ground for V5, 5 V for V6 and for the supply voltage of the current source, the first signal voltage V3 will normally be about 4,5 V as long as no collision occurs. Let us further assume that the resistance RE of the first electrode is about 3 k$\Omega$ and that the voltage V3' does not exceed 4 V in normal operating conditions. In case of a collision, V3 will drop below 4 V, as the resistances R3 and R2 are much higher than RE. Generally speaking, the resistances R2 and R3 should be high compared to RE (i.e. $R2*R3/(R2+R3) \gg RE$), in order have a significant drop of V3 in case of collision and to prevent current flowing through R2 and/or R3 from distorting the measurement of collision width. If the requirement is fulfilled, the collision width can be directly derived from V3' as the following equation holds:

$$V3' = I \cdot RE \cdot (1-x),$$

where I is the current supplied by the current source 30 and x is the collision width with respect to the total width of the electrodes 10 and 20.

The invention claimed is:

1. A collision recognition device for a vehicle, comprising a pressure sensor with a first electrode and a second electrode, both having first and second ends, said second end of the first electrode being connected to a first terminal of a first resistor, said second end of the second electrode being connected to a first terminal of a second resistor, wherein, during use,
a first voltage V1 is applied to said first end of the first electrode, a second voltage V2 is applied to a second terminal of said first resistor so that a voltage difference between said first terminal of the first resistor and said second terminal of said first resistor fauns a first status voltage indicative of circuit integrity, and that a first signal voltage V3 at said second end of said second electrode is indicative of whether said first and second electrodes are in contact;
a fourth voltage V4 is applied to said first end of the second electrode and a fifth voltage V5 is applied to a second terminal of said second resistor so that a voltage difference between said first terminal of said second resistor and said second terminal of said second resistor farms a second status voltage indicative of circuit integrity.

2. A collision recognition device for a vehicle according to claim 1, wherein said first electrode comprises an elongated patch of resistive material.

3. A collision recognition device for a vehicle according to claim 1, wherein said fourth voltage V4 is obtained by a connection of said first end of the second electrode to a first terminal of a third resistor, a sixth voltage V6 being applied to a second terminal of said third resistor.

4. A collision recognition device for a vehicle according to claim 1, comprising a first switch connected to said second end of the first electrode so that, a seventh voltage V7 is applicable to said second end of the first electrode by closing said first switch.

5. A collision recognition device for a vehicle according to claim 1, comprising a branch with a second switch and a fourth resistor, said branch being connected with its first terminal to said second end of the first electrode so that an eighth voltage V8 is applicable to a second terminal of said branch.

6. A collision recognition device for a vehicle according to claim 2, wherein said second electrode comprises an elongated patch of resistive material.

7. A collision recognition device for a vehicle according to claim 6, wherein each first and second electrode comprises a circuit branch with a switch for controlled shorting of said first or second electrode, respectively.

8. A collision recognition device for a vehicle according to claim 6, wherein a third switch is connected to said first end of the second electrode so that a ninth voltage V9 is applicable to said first end of the second electrode by closing said third switch.

9. A collision recognition device for a vehicle according to claim 4, wherein said first switch is controlled by an electronic control unit, which is responsive to said first signal voltage V3.

10. A collision recognition device for a vehicle according to claim 5, wherein said switch is controlled by an electronic control unit, which is responsive to said first signal voltage V3.

11. A collision recognition device for a vehicle, comprising a pressure sensor with a first electrode and a second electrode, both having first and second ends, said second end of the first electrode being connected to a first terminal of a first current generation means, said first current generation means being able to generate a first current through said first electrode, said second end of the second electrode being connected to a first terminal of a second resistor, said first end of the second electrode being connected to a first terminal of a third resistor, wherein, during use:
said current generation means generates a first current through said first electrode, so that a voltage at the second end of the first electrode is indicative of circuit integrity and that a first signal voltage V3 at said second end of said second electrode is indicative of whether said first and second electrodes are in contact;
a voltage V5 is applied to a second terminal of said second resistor and a voltage V6 is applied to a second end of said third resistor so that a voltage difference between said first terminal of said second resistor and said second terminal of said second resistor forms a second status voltage indicative of circuit integrity.

12. A collision recognition device for a vehicle according to claim 11, wherein said first current generation means is a current source.

13. A collision recognition device for a vehicle, comprising
a pressure sensor with a first electrode and a second electrode, both having first and second ends,
a first current generation means, said first current generation means being able to generate a first current through said first electrode,
a first output terminal connected between said first electrode and said first current generation means
a voltage source for applying a voltage V4 to a first end of said second electrode, and
a second output terminal at said second end of said second electrode, wherein, during use, said current generation means generates a first current through said first electrode, so that a voltage V3' at the first output terminal is indicative of circuit integrity and that a first signal voltage V3 at said second output terminal is indicative of whether said first and second electrodes are in contact.

14. A collision recognition device for a vehicle according to claim 13, wherein said voltage V4 is obtained by a connection of said first end of the second electrode to a first terminal of a third resistor, a voltage V6 being applied to a second terminal of said third resistor.

15. A collision recognition device for a vehicle according to claim 13, wherein said second end of the second electrode is connected to a first terminal of a second resistor, and wherein in use, a voltage V5 is applied to a second terminal of a second resistor so that a voltage difference between said first terminal of said second resistor and said second terminal of said second resistor forms a second status voltage at the second output terminal indicative of circuit integrity.

16. A collision recognition device for a vehicle according to claim 15, wherein said voltage V4 is obtained by a connection of said first end of the second electrode to a first terminal of a third resistor, a voltage V6 being applied to a second terminal of said third resistor.

* * * * *